United States Patent Office 2,790,777
Patented Apr. 30, 1957

2,790,777

PROCESS OF BREAKING PETROLEUM EMULSIONS AND COMPOSITIONS THEREFOR

Willard H. Kirkpatrick, Sugar Land, and Alice Walker, Houston, Tex., assignors to Visco Products Company, Houston, Tex., a corporation of Delaware No Drawing. Application February 16, 1952, Serial No. 271,978

9 Claims. (Cl. 252—340)

This invention relates in particular to the treatment of emulsions of mineral oil and water, such as petroleum emulsions commonly encountered in the production, handling and refining of crude mineral oil for the purpose of separating the oil from the water. Also, the invention relates to the treatment of other water-in-oil type of emulsions wherein the emulsions are produced artificially or naturally and the resolution of the emulsions presents a problem of recovery or disposal.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B. S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Another type of process involves the use of a demulsifying agent of the kind hereinafter described in acidizing operations on petroleum producing strata. In such an operation corrosion inhibited acid is forced down the well and into the formation under pressure. The acid attacks limestone formation enlarging the fissures and openings through which the oil fluids flow to the well pool, thus increasing the production. In many cases, particularly troublesome emulsions are encountered immediately after a well has been acidized. This condition can be minimized and many times eliminated by incorporating a suitable demulsifying composition with the acidizing medium.

Still another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

One object of the present invention is to provide a novel and economical process for resolving emulsions of the character referred to into their component parts of oil and water or brine.

Another object is to provide a novel reagent which is water-wettable, interfacial and surface-active in order to enable its use as a demulsifier or for such uses where surface-active characteristics are necessary or desirable.

The compositions prepared in accordance with this invention and employed for the purpose of breaking water-in-oil emulsions are high molecular weight organic silicon compounds in which a silicon atom is connected through an oxygen atom to a carbon atom forming a part of an ether alcohol, preferably an aliphatic ether polyol. The ether alcohol portion of the molecule consists essentially of oxyalkylene groups containing 1 to 6 carbon atoms in each alkylene group and the major proportion of the molecular weight is preferably attributable to oxypropylene groups (e. g., oxy-1,2-propylene) or to mixed oxyethylene and oxypropylene groups in which the weight ratio of oxyethylene to oxypropylene does not exceed 4:1.

The compositions falling within the scope of the invention can be derived in a number of ways, the following being illustrative:

1. An aliphatic ether alcohol can be condensed with a silicon ester to produce a product having at least one terminal hydroxyl group connected to a polyoxyalkylene chain and a terminal silicon ester group connected to said chain.

2. The product described in (1) can be further esterified by reacting the terminal hydroxyl group with a monobasic or a polybasic organic carboxy acid or acid anhydride.

3. Compositions in (1) can have free hydroxyl groups on the terminal silicon ester group.

4. The products obtained under (3) can be further condensed either with organic monocarboxy acids or polycarboxy organic acids or polycarboxy organic acid anhydrides.

5. The condensation described under (1) can be effected to produce organic silicon compounds characterized by one or more oxysilane groups each connected to at least two polyoxyalkylene chains.

6. The aliphatic ether alcohol which is condensed with a silicon ester as in (1) can have a terminal ether group with the result that the end product has a terminal ether group connected to a polyoxyalkylene chain and a terminal silicon ester group connected to said chain.

7. Where polycarboxy organic acids or acid anhydrides are employed in the reaction the end products can have a terminal carboxy acid group or the polycarboxy acids can form polyesters either by reaction with a terminal hydroxyl group which is a part of a polyoxyalkylene group or by reaction with a terminal hydroxyl group which is a part of a silicon ester group.

8. Where the products contain terminal hydroxy groups they can be reacted further with primary and secondary amines to produce amine addition products. Where the amine employed is an monoamine the end product will be characterized by a terminal secondary or tertiary amino group. Where the amine employed is a polyamine the end product will be characterized by amine groups which are not terminal groups.

9. Where the condensation product has terminal carboxy acid groups it can be condensed further with amines to form amides.

10. Where the condensation product has terminal carboxy acid groups such groups can be neutralized with ammonia, amines or alkalis to form salt groups.

It will be seen from the foregoing discussion that the products prepared in accordance with the invention are essentially linear condensation products characterized by oxyalkylene groups and oxysilane groups in a linear chain. Oxysilane groups may be in an intermediate portion of the chain or at the end of the chain or both. The terminal groups on the chain can be hydroxyl groups, ether groups, carboxylic acid groups, carboxylic acid ester groups, silicon ester groups, amine groups or carboxylic acid amide groups.

The following general formula illustrates one class of compounds which can be prepared in accordance with the invention and are useful for breaking petroleum emulsions:

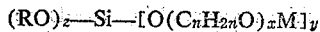

wherein R is alkyl, aryl or cycloalkyl; M is hydrogen, hydrocarbon or acyl; $n$ is 2 to 6; $z$ plus $y$ equals 4; $z$ can vary from 0 to 3; $y$ can vary from 1 to 4, and $x$ is at least 2. In this formula the values for $z$ and $y$ are those which are given for a monomeric product. In most cases the product is a polymer and the entire structure recurs a number of times.

The procedures which are used to prepare these products can be varied within relatively wide limits. In general, it is preferable to use as the source of the oxysilane group a tetraalkoxysilane, for example, tetraethoxysilane which has the following general formula:

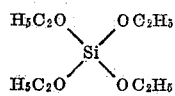

This compound is also referred to as tetraethylorthosilicate. Instead of using a silane compound containing ethoxy groups it is also possible to use as a starting material a silane compound containing methoxy groups or higher alkoxy groups. Some of the alkoxy groups can also be replaced by alkyl groups, for example, methyl, ethyl, propyl, butyl, amyl, and higher homologues, or by aryloxy, cycloalkyloxy, aryl, or aralkyl groups.

The compound which is reacted initially with the tetraethoxysilane or other alkoxysilane derivative should be a compound containing a polyoxyalkylene chain and having one or more terminal hydroxyl groups. Any of the compounds disclosed in United States Patents 2,425,755, 2,425,845, 2,492,955 and 2,527,970 which are characterized by an oxyalkylene chain and a terminal hydroxyl group can be employed for this purpose.

The invention is illustrated but is not limited by the following examples in which the quantities are stated in parts by weight unless otherwise indicated.

*Example I*

In a reaction vessel equipped with thermometer, stirrer, and means for refluxing a solvent with provisions for trapping any water which forms in the course of the reaction, there was mixed 350 parts of Ucon 25–H Special and 20 parts of condensed tetraethyl orthosilicate. The reactants were heated together with stirring at a temperature beginning at 160° C. and increasing to 240° C. After 4 hours of heating, approximately 11 parts of distillate had been secured which was substantially ethanol resulting from the interchange of the ethyl radical. To 100 parts of this ester intermediate there was added 225 parts of a suitable hydrocarbon fraction such as SO₂ extract to yield the finished product suitable for use as a demulsifying agent.

*Example II*

To 200 parts of the ester intermediate from Example I there was added 6 parts of phthalic anhydride and the reactants condensed for a period of 3 hours. The temperature range was maintained between 220° C. and 295° C. A total of 11 parts of aqueous distillate was secured which indicated that the condensation had proceeded to the desired extent. To 100 parts of this reaction product there was added 225 parts of a suitable hydrocarbon fraction such as SO₂ extract to yield the finished product, which was suitable for use as a demulsifying agent.

*Example III*

In equipment similar to that employed in Example I, 350 parts of Ucon 25–H Special and 30 parts of condensed tetraethyl orthosilicate were heated with agitation. At a temperature of 157° C. a distillate began to appear and after 4 hours and a maximum temperature of 242° C. a total of 16 parts of distillate had been secured. This distillate was substantially ethanol indicating that ester interchange had occurred.

To 155 parts of the above intermediate there was added 10 parts of maleic anhydride and 100 parts of a suitable hydrocarbon fraction such as SO₂ extract. Heating was applied to a maximum temperature of 160° C. for 1 hour. The condensed reaction product was then blended with 265 parts of a suitable hydrocarbon fraction such as SO₂ extract to yield the finished material suitable for use as a demulsifying agent.

*Example IV*

In equipment similar to that employed in Example I, 700 parts of Ucon 25–H Special and 60 parts of condensed tetraethyl orthosilicate were heated drastically with stirring. At a temperature of 160° C. a distillate began to appear. Heating was continued for 4½ hours at a maximum temperature of 243° C. with a yield of 32.5 parts of distillate. Toward the end of the heating considerable foaming and darkening of the product occurred.

To 300 parts of this intermediate there was added 30 parts of phthalic anhydride and 100 parts of a suitable hydrocarbon fraction such as SO₂ extract. The mass was heated for 4 hours at a temperature range of 163° C. to 189° C. There was no formation of distillate during this reaction. After cooling there was added to the mass 670 parts of a suitable hydrocarbon fraction such as SO₂ extract to yield the finished product suitable for use as a demulsifying agent.

*Example V*

In equipment similar to that employed in Example I, 600 parts of a polyoxypropylene glycol having a molecular weight of 2,000, 19.2 parts of ethyltriethoxysilane and 100 parts of a suitable hydrocarbon fraction such as SO₂ extract were heated together with agitation until a total of 13.8 parts of distillate were secured. This distillate was substantially ethanol and began to form at 200° C. and continued to a maximum temperature of 247° C.

To 140 parts of this intermediate there was added 5.2 parts of diglycollic acid and 50 parts of a suitable hydrocarbon fraction such as SO₂ extract. Heat was applied with agitation. At approximately 200° C. an aqueous distillate began to form and a total of 2 parts of aqueous distillate was secured after 6 hours at a maximum temperature of 234° C. After cooling, 160 parts of a suitable hydrocarbon fraction such as SO₂ extract was added with stirring to yield the finished product suitable for use as a demulsifying agent.

*Example VI*

To 280 parts of the intermediate as prepared in Example V there was added 10 parts of maleic anhydride and 100 parts of a suitable hydrocarbon fraction such as SO₂ extract. Heating was applied with agitation and the reaction product was heated between 148° and 158° C. for 5 hours. After cooling 340 parts of a suitable hydrocarbon fraction such as SO₂ extract was added with stirring to yield the finished product suitable for use as a demulsifying agent.

*Example VII*

In equipment similar to that employed in Example I, 720 parts of Dow polyglycol 15–200, 19.2 parts of ethyltriethoxysilane and 100 parts of a suitable hydrocarbon fraction such as SO₂ extract were heated with agitation. A total of 11.4 parts of distillate was secured between 191° C. and 227° C. over a period of 6 hours. This distillate was substantially ethanol. The next day heating was continued and an additional 4.1 parts of distillate were secured at about 240° C. over a period of 2 hours. An additional 200 parts of a suitable hydrocarbon fraction such as SO₂ extract was added with stirring to yield this intermediate product.

To 200 parts of the diluted intermediate as above prepared there was added 20 parts of maleic anhydride and 50 parts of a suitable hydrocarbon fraction such as SO₂ extract. The mass was heated for 5 hours at approximately 155° C. Upon cooling, 50 parts of methanol and 175 parts of a suitable hydrocarbon fraction such as SO₂ extract were added to yield the finished product suitable for use as a demulsifying agent.

*Example VIII*

To 200 parts of the diluted intermediate from Example VII, there was added 13 parts of diglycollic acid and 100 parts of a suitable hydrocarbon fraction such as SO₂ extract. The mass was heated slowly with agitation and at 160° C. an aqueous distillate began to appear. After 5 hours additional heating and a maximum temperature of 225° C. there was a total of 3 parts of aqueous distillate formed. After cooling 110 parts of a suitable hydrocarbon fraction such as SO₂ extract was added with stirring to yield the finished product suitable for use as a demulsifying agent.

*Example IX*

In equipment similar to that employed in Example I, 245 parts of Ucon 75–H–150 and 150 parts of condensed tetraethyl orthosilicate were heated with stirring. Initially, the reaction mixture was very milky in appearance and at 118° C. the mass became much clearer and more homogeneous. At 140° C. a distillate began to form. A very rapid reaction occurred at a temperature of 145° C. to 150° C. and a total of 95 parts of distillate was secured. At this stage the product was rubbery but was readily soluble in 150 parts of SO₂ extract.

To 200 parts of this diluted intermediate there was added 11 parts of maleic anhydride and 100 parts of a suitable hydrocarbon fraction such as SO₂ extract. The mass was condensed at 165° C. for 2 hours. After cooling, 90 parts of the distillate secured from the preparation of the intermediate, consisting chiefly of ethanol, was added with stirring. To yield the finished material 200 parts of the above reaction product was blended with 130 parts of a suitable hydrocarbon fraction such as SO₂ extract.

In the foregoing examples, Ucon 25–H Special is a polyoxyalkylene glycol having a molecular weight of approximately 2700 to 3500. The oxyalkylene groups consist of oxyethylene and oxypropylene radicals in a weight ratio of oxyethylene to oxypropylene of 1:3. Dow polyglycol 15–200 is a polyoxyalkylene triol composition in which the oxyalkylene groups consist of oxyethylene and oxypropylene in an equal molecular ratio. Ucon 75–H–150 is an addition product with diethylene glycol of ethylene oxide and 1,2-propylene oxide in a weight ratio of approximately 3:1 and having a molecular weight of approximately 350.

As further illustrations of ether alcohols which can be employed in making condensation products in accordance with the invention there may be mentioned the following:

| | Approximate average molecular weight |
|---|---|
| Ucon 75–H–6000 | 6,000 |
| Ucon 75–H–90,000 | 90,000 |
| Ucon 40–HDG–499 | 1,375 |
| Ucon 40–HDG–755 | 1,850 |
| Ucon 40–HDG–1026 | 2,250 |
| Ucon 40–HDG–1703 | 3,100 |
| Ucon 40–HDG–2412 | 3,800 |
| Ucon 25–HDG–510 | 1,500 |
| Ucon 25–HDG–876 | 2,200 |
| Ucon 25–HDG–1156 | 2,600 |
| Ucon 25–HDG–2157 | 4,000 |
| Ucon 10–HDG–373 | 1,150 |
| Ucon 10–HDG–506 | 1,600 |
| Ucon 10–HDG–700 | 2,100 |
| Ucon 10–HDG–1682 | 3,600 |
| A polyoxypropylene glycol | 750 |
| A polyoxypropylene glycol | 1,025 |
| A polyoxypropylene glycol | 1,525 |
| A polyoxypropylene glycol | 2,000 |
| Ucon 50–HB–660 | 1,700 |
| Ucon 50–HB–3520 | 3,500 |
| Ucon 50–HB–5100 | 5,100 |
| Ucon LB–625 | 1,500 |
| Ucon LB–1145 | 1,700 |
| Ucon 50–HTD–761 | 1,635 |
| Ucon 50–HTD–1294 | 2,192 |
| Ucon 50–HM–1277 | 2,197 |
| Ucon 50–HM–691 | 1,600 |
| Ucon 60–HB–5100 | 5,100 |
| Dow polyglycol 15–100 | 1,000 |
| Dow polyglycol 19–120 | 1,200 |

In the foregoing polyoxyalkylene compounds the symbol "H" means that the compound contains both oxyethylene and oxy-1,2-propylene groups. The symbol "B" stands for butyl. "M" represents methyl. "TD" represents tetradecyl. "DG" represents diethylene glycol. "L" means that the oxyalkylene groups are all oxy-1,2-propylene groups. The numerals in front of the letters indicate the percentage of ethylene oxide in the compound, the remaining percentage being 1,2-propylene oxide. The numerals after the letters indicate the viscosity Sayboldt Universal seconds at 100° F. For example, Ucon 50–HB–5100 is the monobutylether of a polyoxyalkylene glycol containing oxyethylene and oxy-1,2-propylene groups in an approximate weight ratio of 1:1; Ucon LB–1145 is the monobutyl ether of a polyoxypropylene glycol; Ucon 40–HDG–499 is the addition product with diethylene glycol of ethylene oxide and 1,2-propylene oxide in a weight ratio of approximately 2:3; Ucon 25–HDG–2157 is the addition product with diethylene glycol of ethylene oxide and 1,2-propylene oxid in a weight ratio of approximately 1:3; Ucon 10–HDG–1682 is the addition product with diethylene glycol of ethylene oxide and 1,2-propylene oxide in a weight ratio of approximately 1:9. Dow polyglycol 15–100 and Dow polyglycol 19–120 are both trihydroxy compounds. In the case of the Dow polyglycol 15–100 the ethylene oxide and propylene oxide are in an equal molecular ratio. In Dow polyglycol 19–120 the trihydroxy compound is built up with propylene oxide and ethylene oxide in a 2:1 ratio. In compounds containing both oxyethylene and oxy-1,2-propylene groups the weight ratio of oxyethylene to oxy-1,2-propylene preferably should not exceed 4:1.

As illustrations of monovalent organic acids which may be employed to introduce acyl groups into the end products there may be mentioned formic, acetic, propionic, butyric, abietic, trimethylhexanoic, tallol acids, 2-ethylhexanoic, lauric, stearic, trichloroacetic, oleic, ricinoleic, benzoic, phenyl acetic, anthranilic, naphthoic, toluene sulfonic, naphthalene sulfonic and petroleum sulfonic acids.

As examples of polyvalent organic compounds which can be used to introdue acyl groups into the end product there may be mentioned succinic acid, malonic acid, adipic acid, phthalic acid, teraphthalic acid, maleic acid, diglycollic acid and citric acid. Where these acids form anhydrides the anhydrides are the functional equivalents and, in most instances, are preferred over the acids.

The terminal ether groups on the end products can be, for example, methoxy, ethoxy, propyloxy, octyloxy, tetradecyloxy, cetyloxy, myricyloxy and homologues thereof, preferably containing 1 to 30 carbon atoms. The terminal ether groups can also be oxycycloalkyl groups, for example, cyclopentyloxy, cyclohexyloxy and cycloheptyloxy. Alternatively, the terminal ether groups can be oxyaralkyl groups or oxyaryl groups.

In producing amino derivatives, typical specific examples of suitable monoamines are amylamine and diamylamine, cyclohexylamine and dicyclohexylamine, aniline and diphenyl amine, benzylamine and dibenzylamine, methylamine and dimethylamine, ethylamine and diethylamine, isopropylamine and diisopropylamine, butylamine and dibutylamine, decylamine and didecylamine, dodecylamine and didodecylamine, octadecylamine and dioctadecylamine, alpha-naphthylamine and beta-naphthylamine. Typical specific examples of suitable polyamines are ethylene diamine, propylene diamine, butylene diamine, decamethylene diamine, diethylene triamine, triethylenetetramine, tetraethylenepentamine, diisopropylenetriamine, triisopropylenetetramine, o-, m- and p-phenylene diamine, benzidine and naphthylenediamines. The preferred compositions are those in which the amine reactant is initially water insoluble. The preferred compositions also are those in which the composition as a whole is aliphatic rather than aromatic.

Throughout the specification and claims the following definitions apply:

Alkyl—a monovalent radical derived from an aliphatic hydrocarbon by removal of one hydrogen atom, as, for example, methyl, ethyl, propyl, octyl, cetyl, myricyl and their homologues, preferably containing 1 to 30 carbon atoms;

Aralkyl—a monovalent radical derived from an aromatic substituted aliphatic hydrocarbon, as, for example, benzyl, phenylethyl, phenylpropyl, phenylbutyl, phenyloctyl, phenylcetyl, phenyloctadecyl and homologues, preferably containing 1 to 30 carbon atoms in the alkyl chain;

Cycloalkyl—a monovalent radical derived from a cycloaliphatic hydrocarbon, as, for example, cyclopentyl, cyclohexyl and cycloheptyl;

Aryl—a monovalent radical derived from an aromatic hydrocarbon by removal of one hydrogen atom, as, for example, phenyl and naphthyl;

Acyl—a monovalent radical derived from an organic acid by the removal of the hydroxy group, as, for example, formyl, acetyl, propionyl, butyryl, octoyl, lauryoyl, stearoyl, trichloroacetyl, oleyl, ricinoleyl, benzoyl, phenylacetyl, naphthoyl, mono- and diphthaloyl, mono- and di-maleoyl, mono- and di-malonyl, mono- and di-adipoyl, mono- and di-glutamoyl, mono- and di-succinoyl, toluene sulfonyl, naphthalene sulfonyl and acyl radicals derived from petroleum sulfonic acids;

Oxyalkyl—a monovalent radical derived from an aliphatic alcohol by removal of the hydrogen atom of an alcoholic hydroxyl, as, for example, methoxy, ethoxy, propyloxy, octyloxy, cetyloxy, myricyloxy, and homologues thereof, preferably containing 1 to 30 carbon atoms;

Oxyaralkyl—a monovalent radical derived from an aralkyl alcohol by removal of the hydrogen atom of an alcoholic hydroxyl, as, for example, —O—CH2C6H5, —O—C2H4C6H5, oxypropylphenyl, oxybutylphenyl, oxyoctylphenyl, oxycetylphenyl, oxyoctadecylphenyl, and homologues thereof, preferably containing 1 to 30 carbon atoms in the alkyl chain;

Oxyaryl—a monovalent radical derived from a phenol by removal of the hydrogen of the phenolic hydroxy, as, for example, phenoxy, naphthoxy, and homologues thereof;

Oxycycloalkyl—a monovalent radical derived from a cycloaliphatic alcohol by removal of the hydrogen of the alcoholic hydroxy, as, for example, cyclopentyloxy, cyclohexyloxy, cycloheptyloxy, and homologues;

Oxyacyl—a monovalent radical having the structure

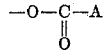

where

represents an acyl group, as, for example, the formic acid ester, acetic acid ester, ricinoleic acid ester, diglycolic acid esters, phthalic acid esters, tallol esters, succinic acid esters, abietic acid ester, trimethylhexanoic acid ester, esters formed from alcoholysis products of castor oil, and homologues thereof;

Secondary amino—a monovalent radical derived by the removal of hydrogen from a nitrogen atom of a primary amine, as, for example, methylamino, ethylamino, butylamino, and higher hololgues;

Tertiary amino—a monovalent radical derived by the removal of hydrogen from a nitrogen atom of a secondary amine, as for example, dimethylamino, diethylamino, di-isopropylamino, dibutylamino and higher homologues.

Especially good results have been obtained in the breaking of water-in-oil petroleum emulsions wtih the polyoxyalkylene polyol oxysilanes esterified with polycarboxy aromatic anhydrides, for example, phthalic anhydride and maleic anhydride, either in the form of their mono esters or as polyesters. The products of Examples I, II, III, IV and V merit special mention.

By way of illustrating the effectiveness of the products contemplated by the invention the method of testing their efficiency in bottle tests will be described and exemplary data given.

*Example X*

Field bottle tests were made on samples of emulsified oil taken from the Stanolind Oil and Gas Company field at Hastings, Texas. The sample grind out showed that these emulsions contained about 27 parts of water per 100 parts of emulsion. A gun barrel system was being used in the field.

100 cc. samples were taken and placed in conventional field test bottles. A finding ratio test indicated a treating ratio of 0.08 cc. of a 10% solution of the treating chemical was required per 100 cc. of sample.

Every effort was made to maintain conditions comparable to those present in a full scale plant treatment.

The test chemical was added to the samples in the test bottles and each bottle was agitated by shaking it 200 times at atmospheric temperatures. The compositions in the test bottles were then allowed to settle and were tested for water drop at predetermined periods of time.

After cold agitation each sample was heated to a temperature of 140° F. and shaken an additional 100 times. After agitation at the elevated temperatures the samples were allowed to stand to permit settling and stratification of the water and were again tested for water drop.

The period of time used for testing the samples after cold agitation was 15 minutes and after hot agitation was 20 minutes. The composition of Example II causes 24 out of the 27 parts of water to separate before the bottles were given hot agitation and 25 out of the 27 parts of water to separate after the hot agitation. The color of the oil was green and the results showed that the emulsion was broken very effectively.

*Example XI*

With the same procedure as described in Example X the composition of Example III caused 25 out of the 27 parts of water to separate before the bottles were given hot agitation and 26 out of the 27 parts of water to separate after hot agitation.

*Example XII*

With the same procedure as described in Example X the composition of Example V caused 19 out of the 27 parts of water to separate before hot agitation and 26 out of the 27 parts of water to separate after hot agitation.

*Example XIII*

With the same procedure as described in Example X the composition of Example VI caused 20 out of the 27 parts of water to separate before hot agitation and 24 out of the 27 parts of water to separate after hot agitation.

*Example XIV*

With the same procedure as described in Example X the composition of Example VIII caused 23 out of the 27 parts of water to separate before hot agitation and 26 out of the 27 parts of water to separate after hot agitation.

*Example XV*

With the same procedure as described in Example X the composition of Example IX caused 11 out of the 27 parts of water to separate before hot agitation and 18 out of the 27 parts of water to separate after hot agitation.

It will be noted that the best results were not obtained with the composition of Example IX which may be attributable in part at least to the fact that this composition has a much lower molecular weight. In general, the molecular weight of the composition attributable to the oxyalkylene groups should be at least 1000 and preferably about 1500 to about 5000 in order to secure optimum results.

The compositions prepared in accordance with the invention were also tested as demulsifying agents on petroleum emulsions taken from other oil fields and satisfactorily resolved these emulsions into their components of oil and water. In the emulsions treated the quantity of water present in the emulsion varied considerably. For example, one of the petroleum emulsions contained 40% water and another 72% water.

It should be understood that the results will vary upon the emulsion being tested.

The demulsifying compositions of the present invention are preferably employed in the proportions of one part of demulsifying agent to from 10,000 to 100,000 parts of emulsion either by adding the concentrated product directly to the emulsion or after diluting with a suitable vehicle in the customary manner.

Among the suitable hydrocarbon vehicles which can be employed as diluents is sulfur dioxide (SO$_2$) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as SO$_2$ extract. Examples of the other suitable hydrocarbon vehicles are Gray Tower polymers, toluene, xylene, gas oil, Diesel fuel, Bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The products prepared in accordance with the invention are very useful in breaking petroleum emulsions, especially those in which the oil is paraffinic or paraffinic-naphthenic, and are suitable for use in breaking water-in-oil petroleum emulsions in the Mid-Continent oil fields, including Oklahoma, Illinois, Kansas, the Gulf coast, Louisiana, Southwest Texas and California.

The invention is hereby claimed as follows:

1. A process of breaking water-in-oil emulsions which comprises treating such emulsions with an organic ester of an organic carboxylic acid and a polyoxyalkylene oxysilane having a hydroxy group connected to a polyoxyalkylene chain capable of reacting with said organic carboxylic acid, there being 1 to 6 carbon atoms in each oxyalkylene group of said ester and not more than 4 polyoxyalkylene chains attached to each silicon atom, the molecular weight of said ester attributable to said oxyalkylene groups being at least 1500.

2. A process of breaking water-in-oil emulsions which comprises treating such emulsions with an organic ester of a carboxylic organic acid and a polyoxyalkylene polyol oxysilane, there being 1 to 6 carbon atoms in each oxyalkylene group of said ester and not more than 4 polyoxyalkylene groups attached to each silicon atom, the molecular weight of said ester attributable to said oxyalkylene groups being at least 1500.

3. A process of breaking water-in-oil emulsions which comprises treating such emulsions with an organic ester of a monocarboxylic organic acid and a polyoxyalkylene polyol oxysilane, there being 1 to 6 carbon atoms in each oxyalkylene group of said ester and not more than 4 polyoxyalkylene groups attached to each silicon atom, the molecular weight of said ester attributable to said oxyalkylene groups being at least 1500.

4. A process of breaking water-in-oil emulsions which comprises treating such emulsions with an organic ester of a polycarboxylic organic acid and a polyoxyalkylene polyol oxysilane, there being 1 to 6 carbon atoms in each oxyalkylene group of said ester and not more than 4 polyoxyalkylene groups attached to each silicon atom, the molecular weight of said ester attributable to said oxyalkylene groups being at least 1500.

5. A process of breaking water-in-oil emulsions which comprises treating such emulsions with an organic ester of a dicarboxylic organic acid and a polyoxyalkylene polyol oxysilane, there being 1 to 6 carbon atoms in each oxyalkylene group of said ester and not more than 4 polyoxyalkylene groups attached to each silicon atom, the molecular weight of said ester attributable to said oxyalkylene groups being at least 1500.

6. A process of breaking water-in-oil emulsions which comprises treating such emulsions with a polyester of a dicarboxylic organic acid and a silicon ester of a polyoxyalkylene polyol having at least one free hydroxyl group, the oxyalkylene groups of said polyol being from the group consisting of oxy-1,2-propylene groups and both oxyethylene and oxy-1,2-propylene groups in a weight ratio of oxyethylene to oxy-1,2-propylene not exceeding 4:1 and the molecular weight of said polyester attributable to said oxyalkylene groups being at least 1500.

7. A process of breaking water-in-oil emulsions which comprises treating such emulsions with a polyester of phthalic anhydride and a silicon ester of a polyoxyalkylene polyol having at least one free hydroxyl group, the oxyalkylene groups of said polyol being from the group consisting of oxy-1,2-propylene groups and both oxyethylene and oxy-1,2-propylene groups in a weight ratio of oxyethylene to oxy-1,2-propylene not exceeding 4:1 and the molecular weight of said polyester attributable to said oxyalkylene groups being at least 1500.

8. A process of breaking water-in-oil emulsions which comprises treating such emulsions with a polyester of maleic anhydride and a silicon ester of a polyoxyalkylene polyol having at least one free hydroxyl group, the oxyalkylene groups of said polyol being from the group consisting of oxy-1,2-propylene groups and both oxyethylene and oxy-1,2-propylene groups in a weight ratio of oxyethylene to oxy-1,2-propylene not exceeding 4:1 and the molecular weight of said polyester attributable to said oxyalkylene groups being at least 1500.

9. A process of breaking water-in-oil emulsions which comprises treating such emulsions with a polyester of diglycollic acid and a silicon ester of a polyoxyalkylene polyol having at least one free hydroxyl group, the oxyalkylene groups of said polyol being from the group consisting of oxy-1,2-propylene groups and both oxyethylene and oxy-1,2-propylene groups in a weight ratio of oxyethylene to oxy-1,2-propylene not exceeding 4:1 and the molecular weight of said polyester attributable to said oxyalkylene groups being at least 1500.

References Cited in the file of this patent

UNITED STATES PATENTS

| | | |
|---|---|---|
| 2,480,822 | Hyde | Sept. 6, 1949 |
| 2,481,349 | Robie | Sept. 6, 1949 |
| 2,495,362 | Barry et al. | Jan. 24, 1950 |
| 2,605,231 | De Groote | July 29, 1952 |
| 2,654,714 | Kirkpatrick | Oct. 6, 1953 |